(12) United States Patent
Johnson et al.

(10) Patent No.: US 6,763,930 B2
(45) Date of Patent: Jul. 20, 2004

(54) ACCUMULATION CONVEYOR ASSEMBLY

(75) Inventors: James P. Johnson, Rockford, MI (US); Gerald A. Brouwer, Grandville, MI (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 0 days.

(21) Appl. No.: 10/116,558

(22) Filed: Apr. 4, 2002

(65) Prior Publication Data

US 2003/0173187 A1 Sep. 18, 2003

Related U.S. Application Data

(60) Provisional application No. 60/363,987, filed on Mar. 14, 2002.

(51) Int. Cl.⁷ .............................................. B65G 47/26
(52) U.S. Cl. ............................. 198/459.6; 198/459.7; 198/463.6; 193/35 A
(58) Field of Search ........................ 198/459.6, 459.7, 198/463.4, 463.6, 633; 193/35 A (56) References Cited

U.S. PATENT DOCUMENTS

| | | | |
|---|---|---|---|
| 1,669,497 A | * | 5/1928 | Steegmuller ............... 193/35 A |
| 3,116,818 A | | 1/1964 | De Good et al. .............. 193/32 |
| 3,116,823 A | | 1/1964 | Schneider .................... 198/160 |
| 3,216,547 A | | 11/1965 | De Good et al. .............. 193/32 |
| 3,250,375 A | | 5/1966 | Bonthuis et al. .............. 198/34 |
| 3,730,330 A | | 5/1973 | De Good ................. 198/127 R |
| 3,734,311 A | | 5/1973 | Thompson et al. ...... 214/16.4 A |
| 3,768,630 A | | 10/1973 | Inwood et al. ........... 198/127 R |
| 3,770,102 A | | 11/1973 | DeGood .................. 198/127 R |
| 3,786,944 A | | 1/1974 | Daigle et al. ............... 214/16.4 |
| 3,799,365 A | | 3/1974 | Sullivan et al. ............ 214/11 R |
| 3,854,576 A | | 12/1974 | Bowman ..................... 198/184 |
| 4,219,114 A | * | 8/1980 | Kovacs ...................... 193/35 A |
| 4,542,815 A | | 9/1985 | Leemkuil ................... 193/35 A |
| 5,191,967 A | | 3/1993 | Woltjer et al. ............... 198/781 |
| 5,358,097 A | | 10/1994 | Bakkila et al. .............. 198/781 |
| 5,429,225 A | | 7/1995 | Schiesser et al. ....... 198/781.06 |
| 5,540,323 A | | 7/1996 | Schiesser et al. ....... 198/781.06 |
| 5,676,235 A | * | 10/1997 | Sam et al. ................. 193/35 A |
| 6,065,588 A | | 5/2000 | Cotter et al. ............ 198/781.06 |
| 6,575,286 B1 | * | 6/2003 | Mills ......................... 193/35 A |

* cited by examiner

Primary Examiner—Joseph Valenza
(74) Attorney, Agent, or Firm—Van Dyke, Gardner, Linn & Burkhart, LLP (57) ABSTRACT

An accumulation conveyor of the present invention includes a frame, which comprises spaced apart side frame members, and a plurality of rollers that are rotatably supported between the side frame members. The conveyor includes a stop member and an actuator that selectively moves the stop member between an extended position wherein at least a portion of the stop member is extended above the conveying surface for stopping one or more articles conveyed on the conveying surface and a retracted position wherein the stop member is below said conveying surface. The actuator and the stop member are supported and positioned between said side frame members when the stop member is moved between its retracted position whereby the stop member and the actuator comprise a low-profile stop assembly.

40 Claims, 5 Drawing Sheets

ACCUMULATION CONVEYOR ASSEMBLY

This application incorporates by reference herein in its entirety pending U.S. provisional application Ser. No. 60/363,987, filed Mar. 14, 2002, entitled ACCUMULATION CONVEYOR ASSEMBLY, by Applicants James P. Johnson and Gerald A. Brouwer.

TECHNICAL FIELD AND BACKGROUND OF THE INVENTION

The present invention relates to accumulation conveyors and particularly to accumulation conveyors that incorporate case stops to control the flow of articles across the conveying surface of the conveyors.

In order to control the flow of articles in a conveyor system, conveyor systems often incorporate one or more accumulation conveyors. The accumulation conveyors either slow down or stop the flow of articles over a preselected zone or predetermined location along the path of the conveyor system. In roller accumulation conveyors, the accumulation conveyor includes case stops or stops which are actuated to extend between the rollers above the conveying surface to limit or stop the movement articles conveyed on the conveying surface of the rollers. Typically, the stops are moved by mechanical linkages or the like which extend through the roller conveyor from below the conveyor to above the conveyor to thereby extend the stop to its extended position. Thus, the stops and their linkages increase the overall height of the accumulation conveyor and, hence, the space requirements for the accumulation conveyor, which often can create clearance problems in the field and, therefore, limits the flexibility of the accumulation conveyor. In addition, when conveying relatively heavy articles, the weight of the articles against the stop often causes the stop to bind in its extended position.

Consequently, there is a need for an accumulation conveyor which can provide a more compact arrangement and, therefore, reduce the clearance requirements for the accumulation conveyor. In addition, there is a need for a stop assembly that will exhibit less binding than stop assemblies heretofore known.

SUMMARY OF THE INVENTION

Accordingly, the present invention provides an accumulation conveyor with a low-profile stop assembly that controls the flow of packages across the conveying surface when actuated. Furthermore, when actuated, the stop member of the stop assembly is locked in position. In addition, the stop member is adapted to minimize binding even when articles are tightly pressed against the stop.

In one form of the invention, an accumulation conveyor includes a frame, which comprises spaced apart side frame members, and a plurality of rollers, which are rotatably supported between the side frame members. The conveyor further includes a stop member and an actuator. The actuator selectively moves the stop member between an extended position wherein at least a portion of the stop member is extended above the conveying surface for stopping one or more articles conveyed on the conveying surface of the rollers and a retracted position wherein the stop member is below the conveying surface. The actuator and the stop member are supported and positioned and substantially contained between the side frame members when the stop member is in its retracted position so that the actuator and the stop member form a low-profile stop assembly.

In one aspect, the actuator comprises a linear actuator, such as a cylinder or a solenoid, or the like. Preferably the actuator comprises at least one cylinder, such as a double acting cylinder.

According to other aspect, the stop member is pivotally mounted to one of the rollers, preferably an upstream roller. In addition, the actuator includes a pair of pivot arms, which pivotally mount the stop member to the upstream roller. For example, the pivot arms may be interconnected by a transverse member, with the actuator moving the transverse member to thereby pivot the stop member about the roller to move the stop member to its extended position.

In a further aspect, the actuator includes a wedge-shaped pusher, which has an angled cam surface that translates inner movement of the actuator into rotational movement of the pivot arms and generally vertical movement for the stop member.

In other aspects, the actuator and the stop member are uncoupled. In other words, the actuator simply pushes the stop member to its extended position. In addition, the stop member is locked in position when the actuator has moved the stop member to its extended position.

In another aspect, the conveyor includes a mounting plate, which is mounted to the side frame members, with the stop member and the actuator positioned and supported at or above the mounting plate wherein the stop member and the actuator are contained in the frame by the mounting plate. For example, side frame members may comprise channel members with bottom flanges, to which the mounting plate is mounted.

According to another form of the invention, an accumulation conveyor includes a frame, a plurality of rollers, which are rotatably supported by the frame, and a stop member. The conveyor further includes an actuator that selectively moves the stop member between an extended position, wherein at least a portion of the stop member is extended above the conveying surface of the rollers for stopping one or more articles conveyed on the conveying surface of the rollers, and a retracted position, wherein the stop member is below the conveying surface. When moved between its extended position and its retracted position, the stop member moves in an arcuate path with the stop member moving in the arcuate path in a downstream direction relative to the conveying direction when the stop member is moved from its extended position to its retracted position to thereby minimize binding between the stop member and the articles on the conveying surface.

In one aspect, the stop member is pivotally mounted to one of the rollers and, preferably, to one of the rollers upstream from the stop member. In a further aspect, the conveyor further includes a pair of pivot arms that pivotally mount the stop member to the upstream roller. Preferably, the pivot arms are interconnected by a transverse member, with the actuator moving the transverse member to thereby pivot the stop member about the upstream roller to move the stop member to its extended position. For example, the actuator may comprise a linear actuator, such as a cylinder or a solenoid or the like.

According to yet another form of the invention, an accumulation conveyor includes a frame, a plurality of rollers which are rotatably supported by the frame, a stop member, and an actuator that selectively moves the stop member between an extended position wherein at least a portion of the stop member is extended above the conveying surface of the rollers for stopping one or more articles conveyed on the conveying surface of the rollers and a retracted position wherein the stop member is below the conveying surface. When moving between its extended and retracted positions, the stop member pivots about an upstream roller from the stop member.

In can be appreciated that the present invention provides an accumulation conveyor with a low-profile stop assembly that results in a compact accumulation conveyor that minimizes the space requirements and simplifies installation process of the accumulation conveyor. In addition, the stop member is adapted to move away from, such as in an downstream direction, from the stopped article when moved to its retracted position to thereby minimize binding.

These and other objects, advantages, purposes, and features of the invention will become more apparent from the study of the following description taken in conjunction with the drawings.

DETAILED DESCRIPTION OF THE PREFERRED EMBODIMENTS

Figure 1:
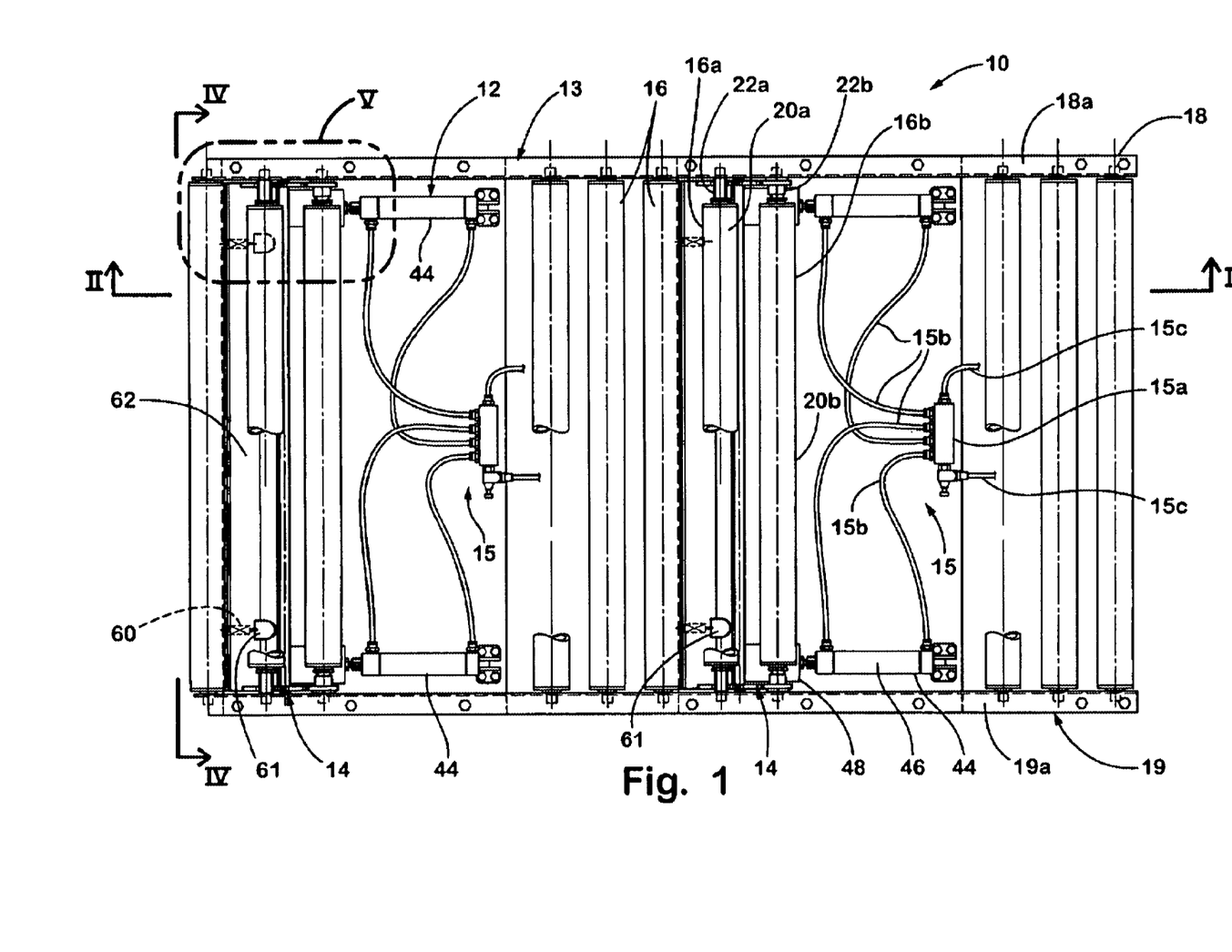
FIG. 1 is a plan view of an accumulation conveyor assembly incorporating a low-profile stop assembly of the present invention.

Referring to FIG. 1, the numeral 10 generally designates an accumulation conveyor of the present invention. Accumulation conveyor 10 is particularly suitable as an inline accumulation conveyor for controlling the flow of articles across the conveying surface of conveyor 10. Accumulation conveyor 10 includes a pair of pair of stop assemblies 12 which are selectively actuated to control the flow of articles across the conveying surface of conveyor 10. As will be more fully described below, stop assemblies 12 include a stop member 14 that is moved between a retracted position or down position (FIG. 2) in which stop member 14 is below the conveying surface of conveyor 10 and an extended or up position (FIG. 3) in which at least a portion of the stop member extends above the conveying surface of conveyor 10 to stop the flow of articles across the conveying surface in a manner that minimizes binding and, further, uses less space than heretofore known.

Accumulation conveyor 10 includes a frame 13 and a plurality of rollers 16, which are mounted between opposed side members 18 and 19 of frame 13. Rollers 16 may comprise gravity rollers or driven rollers. Each stop assembly 12 is positioned below rollers 16 and includes stop member 14 which, in the illustrated embodiment, is positioned between adjacent rollers 16 and 16a and which is pivoted about an upstream roller 16b. It should be understood that stop member 14 may be alternately positioned at the input or output end or intermediate positions of conveyor 10. Roller 16a and upstream roller 16b optionally include truncated cylindrical conveying surfaces 20a and 20b, respectively, with extended axle shafts 22a and 22b, respectively, to accommodate the movement of stop member 14, as will be more fully described below.

Figure 2:
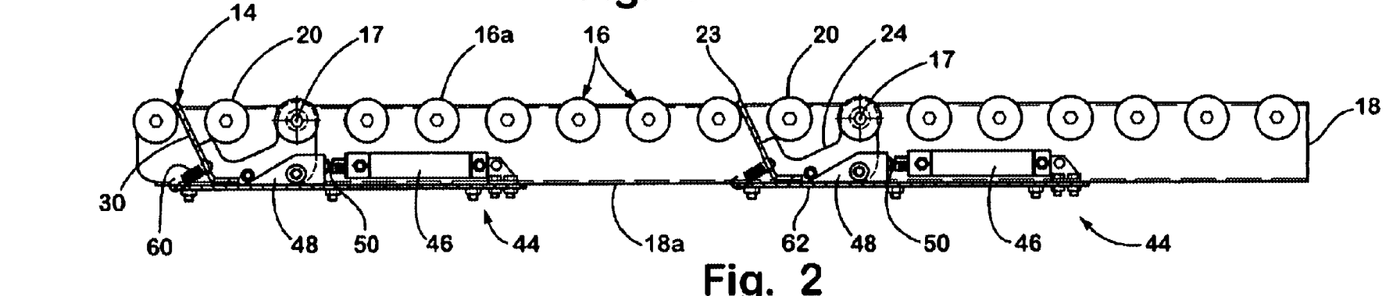
FIG. 2 is a cross-section view taken along line II—II of FIG. 1 illustrating the low-profile stop assembly in an unactuated position.
Figure 3:
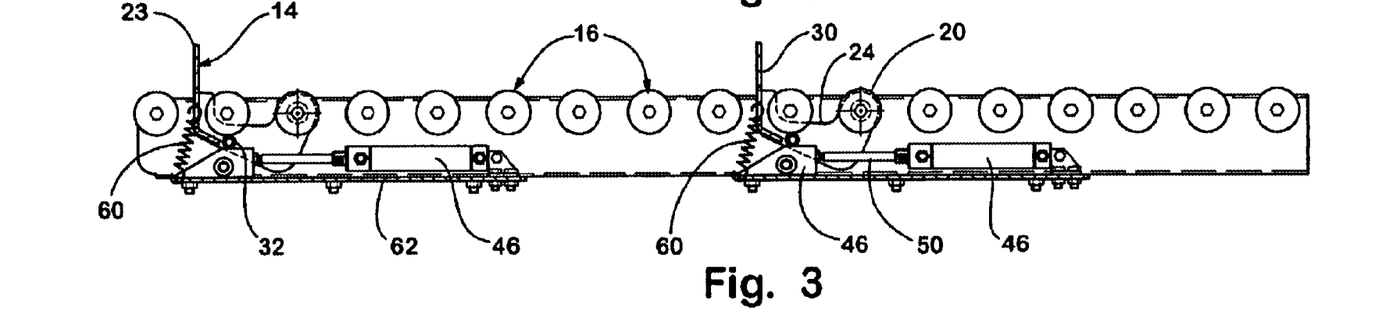
FIG. 3 is a similar view to FIG. 2 illustrating the low-profile stop assembly in an actuated position.
Figure 4:
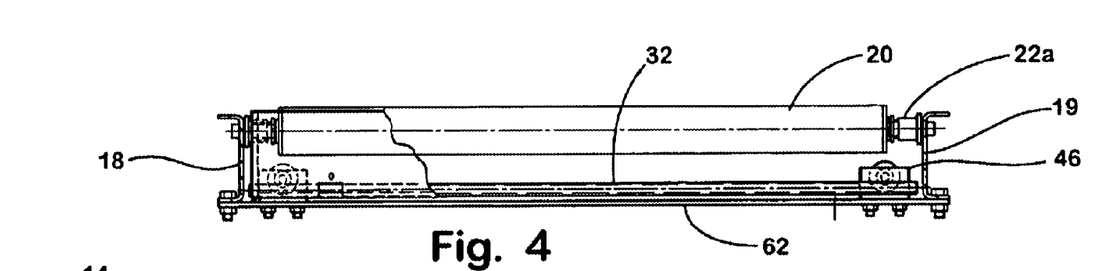
FIG. 4 is a partial fragmentary end view taken along line IV—IV of FIG. 1.
Figure 6:
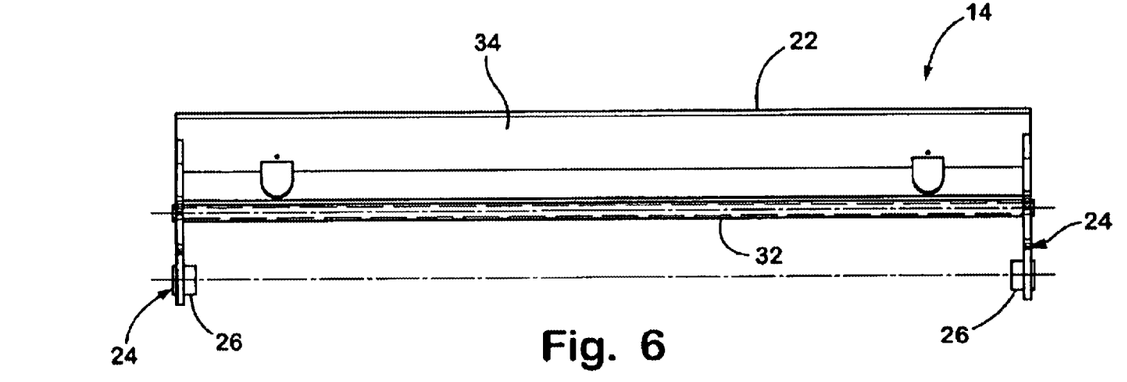
FIG. 6 is an enlarged plan view of a stop member of the stop assembly of FIGS. 1–4.
Figure 7:
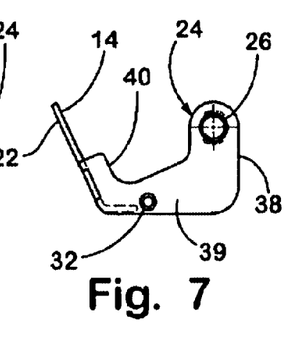
FIG. 7 is an end view of the stop member of FIG. 6.
Figure 8:
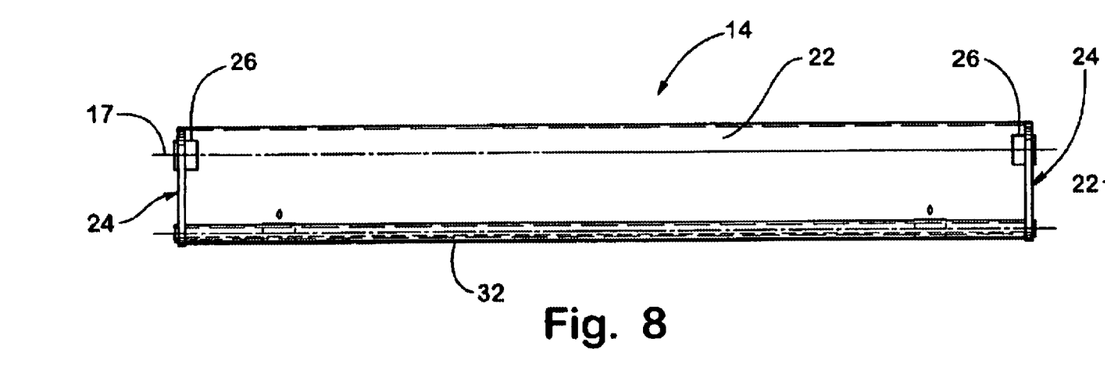
FIG. 8 an elevation view of the stop member of FIG. 6.

As previously noted, stop assembly 12 includes stop member 14, which moves between a retracted or down position (FIG. 2) and an extended position or up position (FIG. 3). Referring to FIGS. 6–8, stop member 14 comprises an elongate plate 22 that extends across the width of conveyor 10 between rollers 16 and 16a. However, it can be appreciated that the width of the stop member may be less than the width of the conveyor. Stop member 14 is mounted to a pair of rocker or fulcrum arms 24, which are journaled on axles 22b of upstream roller 16b by axle adapters 24b. Axle adapters 24b comprise sleeves, preferably plastic sleeves, that act as pivot points for stop member 14. Fulcrum arms 24 comprise generally U-shaped plate members, which are positioned on opposed sides of frame 13 of conveyor 10 and mounted on the respective axle adapters 24b of roller 16b. Optionally and preferably, fulcrum arms 24 include tubular members 26 in which axle adapters 24b are journaled to pivotally mount stop member 14 to the roller 16b to thereby provide a more stable mounting of arms 24 on axle adapters 24a and 24b. Extending between fulcrum arms 24 is a pivot member 32, such as a pivot tube. Pivot member 32 is mounted to fulcrum arms 24 between generally horizontal portions 39 and, further, is offset from axis 17 so that when a force is applied to pivot member 32, stop member 14 will pivot about axis 17. In the illustrated embodiment, stop member 14 and pivot member 32 are both welded to fulcrum arms 24; however, it can appreciated that the components can be assembled using other means, such as fasteners, including rivets, bolts, or the like.

Figure 10:
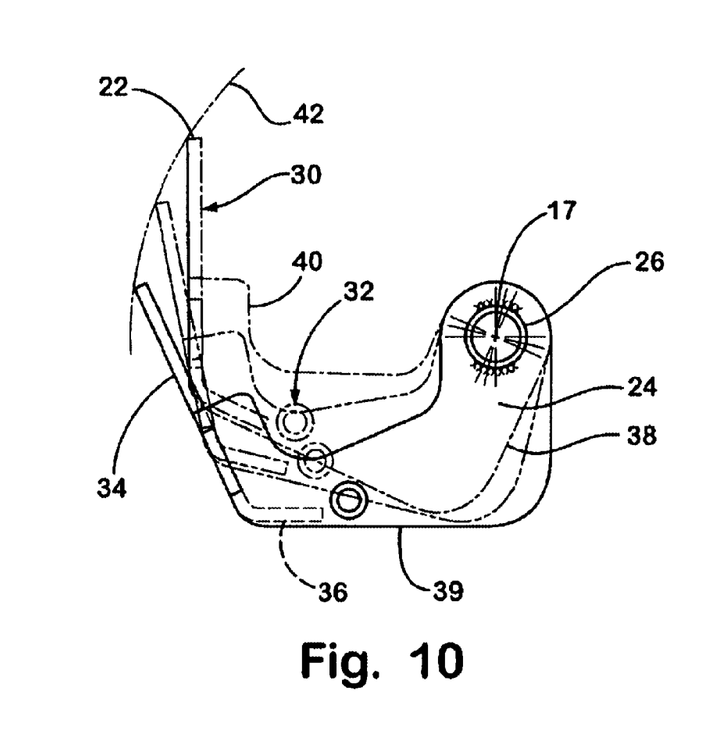
FIG. 10 is a similar view to FIG. 9 illustrating the angular movement of the stop member.

Referring to FIG. 7, plate 22 comprises a generally L-shaped plate with a generally vertical leg 34 and a generally horizontal leg 36 (as viewed in reference to FIG. 7). The distal ends of generally horizontal leg 36 and a lower portion of generally vertical leg 34 are welded to fulcrum arms 24 so that the upper portion of plate 22 extends above fulcrum arms 24. As previously noted, each fulcrum arm 24 comprises a generally U-shaped plate and includes a first generally vertical leg 38 and a second generally upward leg 40, which is angled with respect to generally vertical leg 38 so that legs 38 and 40 are non-parallel. Stop member 14 is mounted to fulcrum arms 24 so that vertical leg 34 of stop member 14 aligns with leg 40 so that it is similarly angled with respect to vertical leg 38 of fulcrum arm 24. Legs 34 and 40 are preferably angled from in a range from about 20° to 40° and, more preferably, in a range of about 25°–35°. In this manner when stop member 14 is pivoted between its extended and retracted positions, stop member 14 moves in an arcuate path 42 so that the stop member falls or moves away, such as in an downstream direction, from the stopped article when moved to its retracted position to minimize binding with the article (FIG. 10). In addition, when moved between its retracted position, stop member 14 (as well as actuators 44 described below) remains positioned or fully contained between side members 18 and 19 of frame 13 to minimize the overall height of accumulation conveyor 10. For example, the overall height of accumulation conveyor may be as low as 2 inches to 3-½ inches.

In the illustrated embodiment, as best seen from FIGS. 2 and 3, stop member 12 pivots about the first upstream roller from the two rollers between which stop member 12 extends; however, it can be appreciated that stop member 14 may be pivoted about the second (or greater) upstream roller from the two rollers between which the stop member extends or about a downstream roller. When pivoted about a downstream roller, stop member 14 may have a mirror image configuration so that the upper potion of stop member 14 can optionally move in a similar arcuate path. Stop member 14 is moved between its extended and retracted positions by a control system 15, which includes one or more actuators 44. In the illustrated embodiment, each actuator 44 comprises a linear actuator, such as a cylinder 46, for example, a double action pneumatic cylinder, with a driver or pusher member 48 mounted to its rod end 50. Actuators 44 extend and contract their respective rod ends in a horizontal plane within frame 13 of conveyor whereby the actuator is contained within said frame, similar to stop member 14 when stop member 14 is moved to its retracted position.

Figure 5:
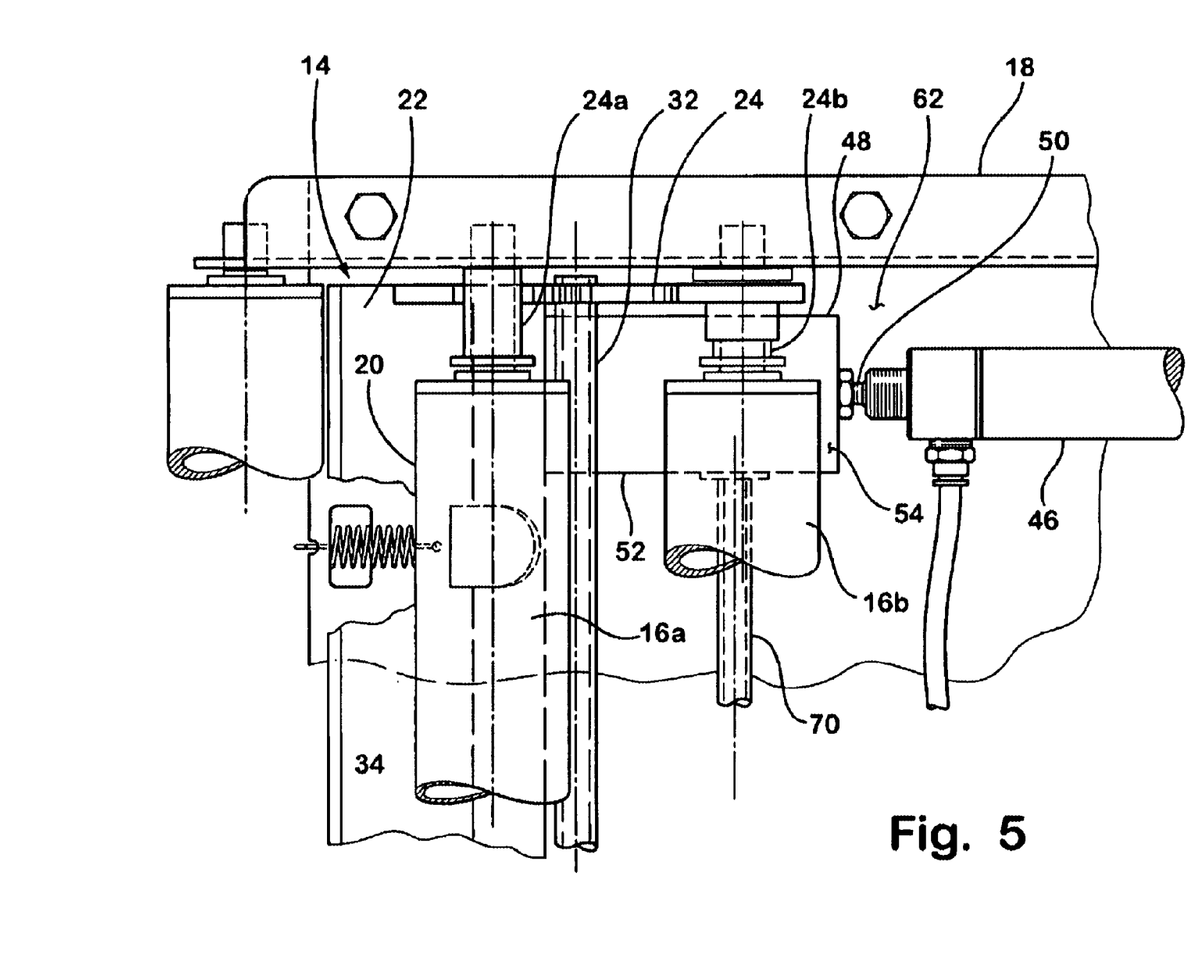
FIG. 5 is an enlarged plan view of detail V of FIG. 1.
Figure 9:
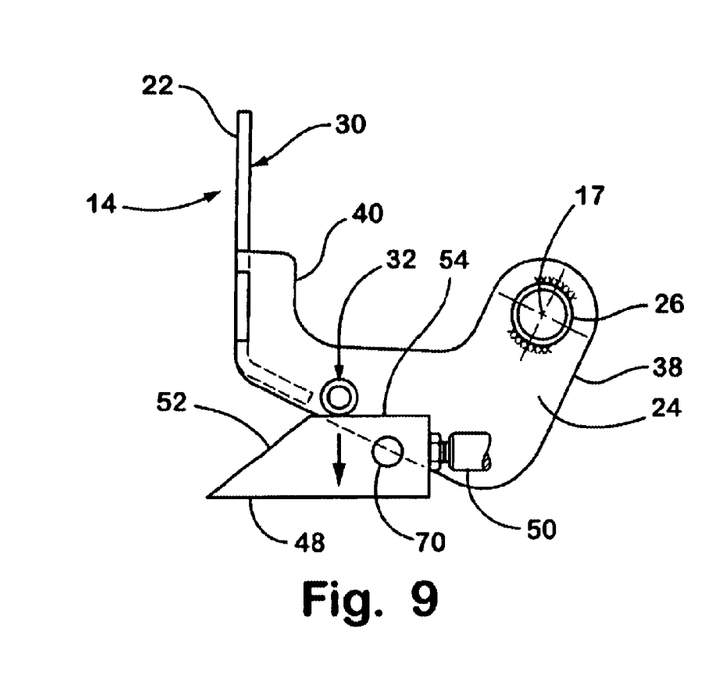
FIG. 9 is an enlarged view of FIG. 7 illustrating the actuator moving the stop member to an extended position.

Referring to FIGS. 5 and 9, pusher member 48 comprises a generally wedged-shaped member with an angled driving surface 52 and a generally horizontal upper surface 54. As best seen in FIG. 2, when cylinders 46 are in their retracted position, pusher members 48 are retracted so that pivot member 32 is at its lowered position and is at most in contact with the lower ends of angled drive surfaces 52. When cylinders 46 are actuated to extend their rods, pusher members 48 push against pivot member 32 with angled drive surfaces 52, which act as camming surfaces, to cause stop member 14 to pivot about axis 17 on its fulcrum arms 24 to extend stop member 14 to its extended position. When cylinders 46 are fully extended, pusher members 48 are extended such that their upper generally horizontal surfaces 54 are positioned under pivot member 32. Referring to FIG. 9, when pusher member 48 are extended, stop member 14 is locked in position with pivot member 32 bearing on generally horizontal surfaces 54 of pusher members 48. In this manner, if either cylinder 46 loses air pressure, for example, which will cause the cylinder to remain in its extended position, stop member 14 will be locked in its extended position. When cylinders 46 are retracted, pusher member 48 is retracted from under pivot member 32 and stop member 14 returns to its retracted position under the force of gravity. Preferably, cylinders 46 comprise pneumatic cylinders (as noted above) and, furthermore, are preferably controlled by a single air supply line so that they work in unison. However, it can be appreciated that cylinders 46 may be individually controlled by a respective air supply line. In addition, it should be understood that either the pusher member 48 or cylinder 46 may be directly coupled to, for example, pivot member 32 so that when cylinder 46 is retracted, stop member 14 is positively retracted to its retracted position by cylinder 46.

In the illustrated embodiment, control system 15 includes a manifold 15a with air supply lines 15b, which connect to cylinders 46, and output and input air lines 15c that connect to a control valve, such as a solenoid valve, that controls the flow of air to cylinder 46. The control valve may be actuated manually or by a sensing roller or a photoeye coupled to a central controller. However, it should be understood that more than one control valve may be used. It should also be understood that a single cylinder may be used to move stop member 14 between its retracted and extended positions. Alternately, pusher member 48 may be operated using one or more solenoids.

As previously noted, stop assembly 12 comprises a low-profile stop assembly and is mounted to frame 14 of conveyor assembly 10 by a mounting plate 62. Mounting plate 62 extends between side members 18 and 20 and is attached, for example by bolting, to the respective flanges 18a and 19a of members 18 and 19. As best seen in FIG. 1, mounting plate 62 provides a mounting surface for actuators 44 and also for springs 60. Referring again to FIGS. 2 and 3, stop assembly 12 optionally includes one or more springs 60 which may assist in returning stop member 14 to its retracted position such that its upper surface 23 is below the conveying surface 20 of rollers 16. In the illustrated embodiment, springs 60 are anchored on one end to mounting plate 62 and anchored at their other end to stop member 14. In addition, stop member 14 may include pads 61 to which springs 60 are mounted, which act as energy absorbers when stop member 14 moves to its fully retracted position. Pads 61 may comprise an energy absorbing material, such as a polymeric material.

As can be appreciate by way of reference to FIGS. 2 and 3, when actuated, stop member 14 moves between a retracted position in which it is substantially positioned below rollers 16 (but above mounting plate 62) to an extended position in which stop member 14 extends (for example between rollers 16 and 16a) with its upper portion 34 extending above conveying surface 20 to thereby provide a stop for articles being conveyed on conveying surface 20. Therefore, unlike the prior art stops, the present stop assembly may fully operate within the framework of the conveyor assembly, thus, eliminating the need to provide clearance below the conveyor assembly.

In the illustrated embodiment, stop member 14 pivots about the first upstream roller 16b with respect to rollers 16 and 16a or a second upstream roller from the stop member. However, it should be appreciated, that the stop member 14 may pivot about a third (or greater) roller upstream from the stop member or a downstream roller. Furthermore, in the illustrated embodiment, pusher blocks 48 are interconnected by a transverse member, such as a rod 70, which provides lateral support to the respective pusher members and maintains the pusher members in their respective linear paths. It should be understood that alternately, pusher members 48 may be combined as a single pusher member which spans the full width of the conveyor assembly.

Preferably, pusher members 48 are formed from a low friction material, such as an ultra high molecular weight (UHMW) material, which reduces the friction between pusher member 48 and pivot member 32 and, hence, the wear on pivot member 30 and on the stop member. Furthermore, it can be appreciated, that the angle of the ramp surface of pusher member 48 may be varied to vary the vertical speed of the stop member.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

We claim:

1. An accumulation conveyor comprising:
   a frame comprising spaced apart side frame members;
   a plurality of rollers rotatably supported between said side frame members, said rollers defining a conveying surface;
   a stop member, said stop member being pivotally mounted to one of said rollers; and
   an actuator selectively pivoting said stop member about one of said rollers, between an extended position wherein at least a portion of said stop member is extended above said roller for stopping one or more articles conveyed on said rollers and a returned position wherein said stop member is below said conveying surface, and said actuator and said stop member being supported and positioned between said side frame members when said stop member is moved to is retracted position whereby said stop member and said actuator comprise a low-profile stop assembly.

2. The accumulation conveyor according to claim 1, wherein said actuator comprises a linear actuator.

3. The accumulation conveyor according to claim 2, wherein said actuator comprises at least one chosen from a cylinder and a solenoid.

4. The accumulation conveyor according to claim 3, wherein said actuator comprises at least one cylinder.

5. The accumulation conveyor according to claim 1, further comprising a pair of pivot arms, said pivot arms pivotally mounting said stop member to said one of said toilers.

6. The accumulation conveyor according to claim 5, wherein said pivot arms are interconnected by a transverse member, said actuator moving said transverse member to thereby pivot said stop member about said one of said rollers to move said stop member to its extended position.

7. The accumulation conveyor according to claim 6, wherein said actuator includes a wedge-shaped pusher, said pusher having an angled cam surface, said cam surface translating movement of said actuator into rotational movement for said pivot arms and generally vertical movement for said stop member.

8. The accumulation conveyor according to claim 1, wherein said stop member comprises a plate member.

9. The accumulation conveyor according to claim 1, wherein said actuator and said stop member are uncoupled.

10. The accumulation conveyor according to claim 9, wherein said stop member is locked in position when said actuator has moved said stop member to said extended position.

11. The accumulation conveyor according to claim 1, further comprising a mounting plate, said mounting plate mounted to said side frame members, said stop member and said actuator positioned and supported at or above said mounting plate wherein said stop member and said actuator are continued in said frame by said mounting plate.

12. The accumulation conveyor according to claim 11, wherein said side frame members have bottom flanges, said mourning plate mounted to said bottom flanges.

13. An accumulation conveyor comprising:
a frame, said frame including a pair of side frame members, each at said side frame members having a lower flange;
a plurality of rollers rotatably supported by said frame, said rollers defining a conveying surface;
a stop member pivotally mounted between said side frame members about a fixed pivot axis, said stop member being pivotally mounted to one of said rollers;
an actuator selectively pivoting said stop member between an extended position wherein at least a portion of said stop member is extended above said conveying surface for stopping one or more articles conveyed on said conveying surface and a retracted position wherein said stop member is below said conveying surface, and said stop member moving in an arcuate path when a moving between said extended position and said retracted position, said stop member pivoting in a downstream direction relative to said conveying direction when said stop member moves in said actuate path from its extended position to said retracted position to thereby minimize binding between said stop member and articles on said conveying surface, and said actuator and said stop member comprising a low profile stop assembly wherein neither said a stop member nor said actuator extend below said flanges of said side frame members.

14. The accumulation conveyor according to claim 13, wherein said one of said rollers is upstream from said stop member.

15. The accumulation conveyor according to claim 13, further comprising a pair of pivot arms, said pivot arms pivotally mounting said stop member to said one of said rollers.

16. The accumulation conveyor according to claim 15, wherein said pivot arms are interconnected by a transverse member, said actuator moving said transverse member to thereby pivot said stop member about said one of said rollers to move said stop member to its extended position.

17. The accumulation conveyor according to claim 16, wherein said actuator comprises a linear actuator.

18. The accumulation conveyor according to claim 17, wherein said linear actuator includes a pusher, said pusher pushing said transverse member to thereby pivot said pivot arms about said one of said rollers to move said stop member to said extended position.

19. The accumulation conveyor according to claim 18, wherein said pusher includes a cam surface, said cam surface pushing said transverse member and translating linear movement of said actuator into rotational movement of said pivot arms and vertical movement for said stop member to thereby pivot said pivot arms about said one of said rollers and to move said stop member to said extended position.

20. The accumulation conveyor according to claim 18, wherein said pusher and said stop member are uncoupled.

21. The accumulation conveyor according to claim 20, wherein said pusher provides a bearing surface for transverse member when said stop member is to said extended position.

22. The accumulation conveyor according to claim 21, wherein said stop member is locked in position when said pusher has moved said stop member to said extended position.

23. An accumulation conveyor comprising:
a frame;
a plurality of rollers rotatably supported by said frame, said rollers defining a conveying surface;
a stop member; and
an actuator selectively moving said stop member between an extended position wherein at least a portion of said stop member is extended above said conveying surface for stopping one or more articles conveyed on said conveying surface and a retracted position wherein said stop member is below said conveying surface, and said stop member pivoting about one of an upstream roller and a downstream roller from said stop member when moving between said extended position and said retracted position.

24. The accumulation conveyor according to claim 23, further comprising a pair of pivot arms, said pivot arms pivotally mounting said stop member to said upstream roller.

25. The accumulation conveyor according to claim 24, wherein said pivot arms are interconnected by a transverse member, said actuator moving said transverse member to thereby pivot said stop member about said upstream roller to move said atop member to its extended position.

26. The accumulation conveyor according to claim 25, wherein said actuator comprises a linear actuator.

27. The accumulation conveyor according to claim 26, wherein said linear actuator includes a pusher, said pusher pushing said transverse member to thereby pivot said pivot arms about said upstream roller to move said stop member to said extended position.

28. The accumulation conveyor according to claim 27, wherein said pusher includes a cam surface, said cam surface pushing said transverse member and translating linear movement of said actuator into rotational movement for said pivot arms and generally vertical movement for said stop member to thereby move said stop member to said extended position.

29. The accumulation conveyor according to claim 27, wherein said pusher and said stop member are uncoupled.

30. The accumulation conveyor according to claim 29, wherein said pusher provides a generally horizontal bearing surface for transverse member when said stop member is moved to said extended position to thereby lock said stop member in said extended position.

31. The accumulation conveyor according to claim 30, wherein said stop member is locked in position moved to said extended position.

32. A method of controlling the flow of articles on a conveying surface of an accumulation roller conveyor, the roller conveyor having a plurality of rollers defining a conveying surface having a conveying direction, said method comprising:

providing a stop member; and mounting the stop member to one of an upstream roller and a downstream roller from the stop member; and pivoting the stop member about the one of an upstream roller and a downstream roller to move the stop member to from a retracted position below the conveying surface of the rollers to an extended position wherein at least a portion of the stop member is above the conveying surface to least slow articles conveyed on the conveying surface of the accumulation conveyor.

33. The method according to claim 32, wherein said stop member moves in an arcuate path when pivoted to said extended position, and said stop member returning in said arcuate path when moving to its retracted position to thereby minimize binding of the stop member.

34. The method according to claim 32, wherein said pivoting comprises pivoting the stop member about a roller upstream from the stop member.

35. The method according to claim 32, wherein said pivoting includes pushing the stop member with a linear actuator.

36. The method according to claim 32, wherein said pivoting includes pushing the stop member with a linear actuator.

37. The method according to claim 32, wherein said pivoting includes 8 pivoting the stop member in an arcuate path from a retracted position to said extended positions, and said stop member returns in said arcuate path and moving in a downstream direction when moving to its retracted position to thereby minimize binding.

38. The accumulation conveyor according to claim 13, wherein said fixed pivot axis is located between said conveying surface and a lower surface of said rollers.

39. The accumulation conveyor according to claim 31, wherein said actuator selectively pivots said stop member about one of said rollers when moving said stop member between said extended position and said retracted position.

40. An accumulation conveyor comprising:

a frame, said framing including frame members, each of said side frame members having a lower flange;

a plurality of rollers rotatably supported by said frame, said rollers defining a conveying surface;

a stop member pivotally mounted between said side frame members about a fixed pivot axis, said first pivot axis being located between said conveying surface and a lower surface of said rollers;

an actuator selectively pivoting said stop member between an extended position wherein at least a portion of said stop member is extended above said conveying surface for stopping one or more articles conveyed on said conveying surface and a retracted position wherein said stop member is below said conveying surface, said actuator selectively pivoting said stop member about one of said rollers when moving said stop member between said extended position and said retracted and wherein said one of said rollers includes said fixed pivot axis, and said stop member moving in an arcuate path when moving between said extended position and said retracted position, said stop member pivoting in a downstream direction relative to said conveying direction when said stop member moves in said actuate path from its extend position to said retracted position to thereby minimize binding between said stop member and articles on said conveying surface, and said actuator and said stop member comprising a low profile stop assembly wherein neither said stop member nor said actuator extend below said flanges of said side frame members.

* * * * *

UNITED STATES PATENT AND TRADEMARK OFFICE
CERTIFICATE OF CORRECTION

| | | |
|---|---|---|
| PATENT NO. | : 6,763,930 B2 | Page 1 of 2 |
| APPLICATION NO. | : 10/116558 | |
| DATED | : July 20, 2004 | |
| INVENTOR(S) | : James P. Johnson and Gerald A. Brouwer | |

It is certified that error appears in the above-identified patent and that said Letters Patent is hereby corrected as shown below:

Column 6:
Line 66, Claim 1, Delete "," after "rollers".

Column 7:
Line 2, Claim 1, "an" should be --on--.
Line 2, Claim 1, "returned" should be --retracted--.
Line 6, Claim 1, "is" should be --its-- in the second occurrence.
Line 19, Claim 5, "toilers" should be --rollers--.
Line 44, Claim 11, "continued" should be --contained--.
Line 47, Claim 12, "mourning" should be --mounting--.
Line 50, Claim 13, "at" should be --of--.
Line 53, Claim 13, "convoying" should be --conveying--.

Column 8:
Line 5, Claim 13, Delete "a" after "said".
Line 67, Claim 25, "atop" should be --stop--.

Column 9:
Line 38, Claim 32, Insert --at-- before "least".

UNITED STATES PATENT AND TRADEMARK OFFICE
CERTIFICATE OF CORRECTION

PATENT NO. : 6,763,930 B2
APPLICATION NO. : 10/116558
DATED : July 20, 2004
INVENTOR(S) : James P. Johnson and Gerald A. Brouwer It is certified that error appears in the above-identified patent and that said Letters Patent is hereby corrected as shown below:

<u>Column 10:</u>
Lines 1-3, Claim 36, Delete the entire claim (36).
Line 5, Claim 37, Delete "8" after "includes".
Line 6, Claim 37, "positions" should be --position--.
Line 13, Claim 39, "31" should be --38--.
Line 18, Claim 40, Insert --a pair of side-- after "including".
Line 34, Claim 40, Insert --position-- after "retracted".
Line 41, Claim 40, "extend" should be --extended--.

Signed and Sealed this

Ninth Day of September, 2008

JON W. DUDAS
*Director of the United States Patent and Trademark Office*